US006380507B1

(12) United States Patent
Childs

(10) Patent No.: US 6,380,507 B1
(45) Date of Patent: Apr. 30, 2002

(54) APPARATUS FOR FEEDING WASTE MATTER INTO A PLASMA ARC FURNACE TO PRODUCE REUSABLE MATERIALS

(76) Inventor: Wayne F. Childs, 405 Broad St., Derry, NH (US) 03063

(*) Notice: Subject to any disclaimer, the term of this patent is extended or adjusted under 35 U.S.C. 154(b) by 0 days.

(21) Appl. No.: 09/558,277

(22) Filed: Apr. 25, 2000

(51) Int. Cl.[7] ................................................ B23K 10/00
(52) U.S. Cl. ............................ 219/121.37; 219/121.36; 219/121.52; 110/246; 588/900
(58) Field of Search ........................ 219/121.36, 121.37, 219/121.38, 121.43, 121.51, 121.59, 121.52; 110/235, 246, 346, 250, 203, 243; 588/900

(56) References Cited

U.S. PATENT DOCUMENTS 4,105,437 A * 8/1978 Liu ............................ 75/10 R
4,504,308 A * 3/1985 Rinesch ....................... 75/10 R
5,281,790 A * 1/1994 Nguyen Handfield et al. ... 219/121.38
5,541,386 A * 7/1996 Alvi et al. ............. 219/121.38
5,766,303 A * 6/1998 Bitler et al. ............... 75/10.19
5,923,698 A * 7/1999 Loebner et al. ............... 373/82
5,943,970 A * 8/1999 Gonopolsky et al. ....... 110/346
6,114,648 A * 9/2000 Takano et al. ......... 219/121.37

* cited by examiner

*Primary Examiner*—Mark Paschall
(74) *Attorney, Agent, or Firm*—Joseph E. Funk

(57) ABSTRACT

Apparatus and a method are disclosed for generating energy from the essentially complete disassociation of organic matter in a plasma arc furnace operating under pyrolytic conditions. Energy is produced by the disassociation in the form of synthesis gases such as hydrogen and carbon monoxide that can be used to generate electricity, and heat energy from the process and from burning the synthesis gasses are also used to generate electricity. In addition, inorganic matter that is input to the furnace is rendered ecologically and biologically safe and is extracted from the furnace to be re-cycled into new uses such as insulation and road paving material. Organic matter, along with non-organic matter, is pre-processed and sized before being input to the plasma arc furnace. The pre-processed matter is fed into a molten silica bath in the furnace through hollow electrodes that are inserted into the silica bath to create the plasma arc. Insertion of the matter through the hollow electrodes provides better disassociation of the waste into its basic elements for re-use, re-cycling and disposal as ecologically and biologically safe materials.

11 Claims, 4 Drawing Sheets

APPARATUS FOR FEEDING WASTE MATTER INTO A PLASMA ARC FURNACE TO PRODUCE REUSABLE MATERIALS

RELATED APPLICATION

This application is related to U.S. Provisional Patent Application No. 60/131,209, entitled ‘Plasma Converter—A System for The Generation Of Energy By The Fast Pyrolysis Of Organic Material And The Conversion Of Hazardous and/or Problem Waste Material Into Simple Elements By Molecular Disassociation’, filed on Apr. 27, 1999.

FIELD OF THE INVENTION

This invention relates to plasma arc furnaces and the production from waste material ionized and disassociated in the furnaces of synthesis gasses and stable inert materials that can be re-cycled or safely placed in landfills, and more particularly to a way of feeding waste matter into such a plasma arc furnace to assure complete ionization and disassociation of the waste matter, and to entrap hazardous or otherwise problem waste materials so that they do not inadvertently escape ionization and disassociation in the furnace.

BACKGROUND OF THE INVENTION

The pollution of our environment is a problem that must be addressed with equipment that is capable of recycling waste material and producing high value products, thereby gaining the social acceptance and generating the income necessary to offset the acquisition and operating costs of the equipment. Such equipment must also be capable of processing very large quantities of waste material in a relatively short period of time, simply and reliably with minimal emissions. Otherwise such equipment will not be accepted nor find the wide spread application and use necessary to significantly improve environmental conditions.

The safe treatment and disposal of all waste materials is demanded in most developed nations. In this regard, there is a growing demand on industry by environmentalists and government agencies to alleviate potentially toxic and/or contaminated waste disposal sites that were employed for many years prior to the public’s heightened environmental concerns and the enactment of environmental legislation.

The daily generation of solid wastes is a fact of life in industrialized society and their disposal is becoming an ever-increasing problem. The more common of these waste materials is Municipal Solid Waste (MSW). Disposal of MSW through landfill is becoming increasingly less attractive and more difficult as sites are becoming full, alternate sites are becoming scarce and the knowledge and reality of contamination of groundwater, adjacent facilities and property are becoming more prevalent and disconcerting. In the search for more efficient and less costly disposal, Energy From Waste (EFW) technologies are being developed which also create energy as a byproduct of the destruction process. The most widely known type of EFW facility is incineration in various forms; however, incinerator EFW system require extensive air pollution control systems to reduce emissions below regulatory levels and they also produce toxic flyashes. EFW systems based on the gasification process have more inherent promise for lower emission of all environmental contaminants through both a cleaner and a lower volume of product gas, and a cleaner solid residue.

The combustion of waste materials to reduce their volume or release heat energy is one of the single greatest causes of air pollution. Such waste materials include municipal solid waste (MSW), industrial or household waste chemicals, chemical weapons, medical waste, infectious or otherwise biologically hazardous materials, human or animal sewerage, soils or marine sediments excavated or dredged from contaminated sites, recovered waste material excavated from landfills, used tires, or used oil filters as well as vegetable or petroleum based oils, oil bearing shale and high sulfur coal.

Finally, waste material that is processed using energy from waste technology that include plasma arc furnaces too often do not completely recover the processed material as byproducts in biologically and ecologically safe forms because the material is not completely ionized and disassociated.

Thus, there is a need in the art for improved apparatus to dispose of waste materials, including MSW, in a cost effective way that will ameliorate the present problems with waste disposal.

There is also a need in the art for improved apparatus to dispose of waste materials, including MSW, that can yield environmentally safe materials that can be recycled into useful products or are safe in landfills.

There is also a need in the art for improved apparatus to dispose of waste materials, including MSW, that can produce byproducts useful to produce electrical energy that can be used to drive the process, and even to be sold and make a profit from using the process.

There is also a need for improved apparatus for completely ionizing and disassociating waste material to eliminate the escape of any biologically and ecologically unsafe materials.

SUMMARY OF THE INVENTION

The foregoing needs in the prior art are met by the present invention. Apparatus is disclosed that utilizes a high temperature plasma arc furnace operating under fast pyrolysis conditions to process many kinds of solid and liquid waste, including municipal solid waste, and produce synthesis gas and inert matter therefrom. This extracts the potential energy value within waste matter without combustion of the matter. Most importantly, the waste matter being processed is fed into the furnace in a way that assures that no biologically and ecologically unsafe materials or byproducts escape the process and are released to the atmosphere.

The synthesis gases produced, which are mainly carbon monoxide (CO) and hydrogen, are then used to produce electricity using molten carbonate fuel cells. The electricity generated is enough to power the plasma arc furnace and there is a surplus that can be sold.

Alternatively, the synthesis gas can safely be used to power a gas turbine or internal combustion reciprocating engine without melting the turbines blades or the valves and piston crowns of an internal combustion engine through the introduction of de-ionized water vapor at their fuel inlets.

Other gasses that may be produced in the process can be separated, collected and re-cycled for use.

Most importantly, the waste matter being processed is fed into a molten bath in the furnace through hollow electrodes that produce the plasma arc in a way that assures that no biologically and ecologically unsafe materials or byproducts escape the ionization and disassociation process and are inadvertently released to the atmosphere.

Hazardous elements remaining in the plasma arc furnace that cannot otherwise be recycled in a safe manner, and non-hazardous materials remaining in the plasma arc furnace, are all entrapped within a silica/ceramic material that is tapped off the furnace to produce a geologically stable, leach proof media capable of being recycled into high value construction or building materials and components. Alternatively, the stable, inert, leach proof media from the plasma arc furnace may safely be placed in landfills.

DESCRIPTION OF THE DRAWING

The invention will be better understood upon reading the following detailed description in conjunction with the drawing in which.

DETAILED DESCRIPTION

Figure 1:
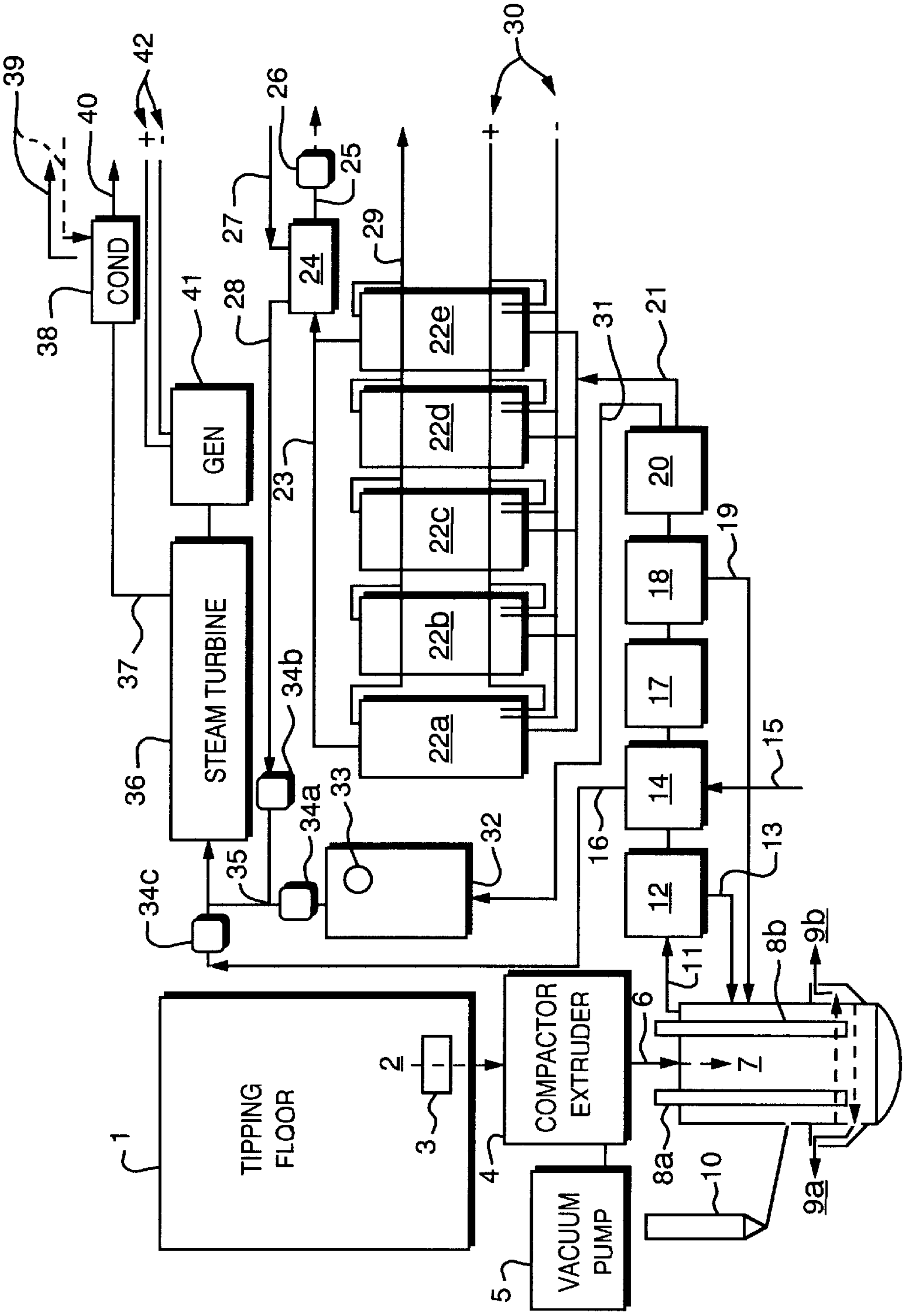
FIG. 1 shows a plasma arc system for the generation of energy by the fast pyrolysis of organic materials and the conversion of hazardous and/or problem waste materials into simple elements by molecular disassociation.

FIG. 1 shows a plasma arc system for the generation of energy by the fast pyrolysis of organic materials and the conversion of hazardous and/or problem waste materials into simple elements by molecular disassociation.

The system configuration shown in FIG. 1 is preferred when a market for recovered carbon dioxide and hydrogen are readily available. Such a system configuration requires the installation of a high temperature hydrogen membrane filtering system, such as that currently licensed for manufacture through the technology transfer program as Oakridge Laboratories to Coor's Ceramic Filter Corp. and its joint venture partner-Pall Advanced Separation Systems, Inc. The system also requires the installation of fuel cell stacks, but since the synthesis gas is being split into pure hydrogen and pure carbon monoxide, it is permissible to employ phosphoric acid and other types of fuel cells, which can not tolerate the presence of carbon monoxide. In this configuration carbon monoxide is diverted to a separate gas fired boiler where is can be used to generate steam. When carbon monoxide is combusted in a gas boiler the composition of the boilers exhaust will be composed of at least twenty-five percent carbon dioxide. The carbon dioxide content of the exhaust of a gas turbine fueled by pure synthesis gas, is at less than 4 percent. Therefore carbon dioxide can not be readily or at least cost effectively recovered. This preferred embodiment of the invention differs significantly from the prior art described in U.S. Pat. No. 5,847,353.

A tipping floor 1 is provided of at least 3500 sq. feet is provided in which to dump and handle municipal solid waste. The loose waste stream 2 is directed to a conveyor belt leading to a non-ferrous metal separation system that includes separator 3. This is important because the alloying of large percentages of ferrous and non-ferrous metal within the plasma arc furnace can so degrade the value of the metals recovered from the furnace that it may actually be necessary to pay for the disposal of this metal as opposed to recovering potential value. There is no provision within this system for the separation of mixed molten metals; however the actual patent application to be filed in the continuation of the patent process may be so equipped.

Eddy current magnetic separator 3 is provided for the recovery of non-ferrous metals after they are separated from ferrous metals.

A compactor/extruder system 4 is provided in order to prepare and deliver municipal solid waste for delivery into the plasma arc furnace. The system can alternatively be equipped with a briquetting and auguring material delivery system and the components listed below.

A vacuum pump 5 or other device is provided for extracting air from the waste stream, or alternatively compactor/extruder system 4 can be fitted with an air displacement chamber utilizing synthesis gas scavenged from the furnace. Removal of air from the waste stream is of critical importance since the introduction of even small amounts of oxygen could allow the synthesis gas to ignite causing an explosion. Additionally the presence of air will cause the formation of light hydrocarbons in the plasma furnace leading to the formation of unwanted, harmful emissions. The exclusion of air is also critical to maintaining peak efficiency in the operation of the equipment since nitrogen can act as a heat sink within the furnace carrying away valuable heat energy. The prepared waste stream 6 which has had non-ferrous metals separated from it, air evacuated and has been properly sized, continues on into the plasma furnace.

Alternatively, an inert gas such as nitrogen, or synthesis gas produced by the pyrolytic operation of the furnace as described in detail hereinafter, may be applied to the waste material under pressure to displace any air in the waste stream.

Inside the plasma arc furnace a high temperature plasma 7 is used to provided temperatures in excess of 4,000° Centigrade so that upon entry of the prepared waste stream 6, disassociation of the molecules composing the prepared waste stream will occur. One or more submersible graphite, solid or hollow electrodes **8*a* and 8*b* are connected individually to separate ten plus megawatt direct current power supplies equipped with the controls to vary current flow which create the high temperature plasma arc 7**.

There is a problem in changing arc electrodes in the plasma arc furnace that is solved by the use of graphite electrodes fitted with externally threaded male and internally threaded female couplings at their ends which facilitate replacement without the withdrawal of the electrodes from the molten pools. This greatly enhances the operation of the plasma arc furnace since it is not necessary to withdraw the electrodes from the furnace in order to replace them. The operator merely threads new electrode sections onto the existing units, turns the power back on and continues with the normal operation of the furnace. In addition, the electrodes are hollow and are used to inject the prepared waste material into the furnace within a molten silica bath over a molten metal pool in the furnace. The molten metal comes from metal in the waste matter that is inserted into the furnace, and the silica bath comes mainly from materials, such as calcium carbonate, that are deliberately injected into the furnace to create the bath and to neutralize predetermined substances detected in the furnace that are harmful to people, the environment and to the system. These substances are described in greater detail further in this Detailed Description.

By injecting the prepared waste matter directly into the silica bath through the hollow electrodes, the waste matter is immediately subject to very high temperatures that completely disassociates the matter and minimizes having to recycle material back into the furnace, or into a second furnace, to finish the disassociation of the matter into its elemental components. This assures complete ionization and disassociation of the waste matter, and entraps hazardous or otherwise problem waste materials so that they do not inadvertently escape ionization and disassociation in the furnace. Such problem waste materials are entrapped within a silica/ceramic material in the molten silica bath that is tapped off the furnace to produce geologically stable, leach proof media capable of being recycled into high value construction or building materials and components, or of being safely disposed of in a landfill.

The plasma arc furnace has an exit port 9*a* at an advantageous position for a molten pool of metal that forms in the bottom of the plasma arc furnace to be drawn off. Port 9*b* is provided an advantageous position for a molten pool of silica that forms above the molten metal to be drawn off.

An automatic feed system 10 is provided to add calcium carbonate to the molten silica pool inside the plasma arc furnace to remove certain gasses from the synthesis gas. A computer receiving data on the chlorine content of the synthesis gas controls the injection of calcium carbonate into the furnace by automatic feed system 10. The synthesis gas produced is monitored by process gas spectrometer 17. When process gas spectrometer 17 detects the presence of a multitude of chemical compounds and the presence of vaporized metals, including furans or dioxins, and signals a computer control unit which causes a control valve 18 to re-route the flow of synthesis gas contaminated with hazardous materials back into the plasma arc furnace via a return line 19 for further processing. Calcium carbonate is automatically added in sufficient quantities to absorb any molecules of chlorine, which might be present within the furnace. When process gas spectrometer 17 no longer detects the presence of furans or dioxins, control valve 18 reverts back to its normal position and the synthesis gas can then flow through the system normally. This sub-system is critical to preventing the release of furans or dioxins into the atmosphere.

Process gas spectrometer 17 is similar to the ABB/EXTREL Questor IV™ and a computer controlled metering system designed to automatically add properly proportioned amounts of calcium carbonate to the molten silica pool. This system is critical to the safe operation of any plasma arc furnace being used to process municipal solid waste or other waste materials which might contain chlorine or other potentially hazardous components. The device monitors the synthesis gas stream, after it is formed and leaves the plasma arc furnace via the vent pipe.

In order to prevent the release of furans or dioxins it is necessary to add the proper amount of calcium chloride to the molten silica pool within the furnace to absorb any chlorine molecules that may enter the furnace via the waste stream to be processed. Sampling of the waste stream prior to its entering the furnace is not practical when dealing with the quantities of material this invention is intended to process. The only practical alternative therefore is to monitor the synthesis gas stream emanating from the furnace.

When chlorine, furans, dioxins, other unwanted hazardous chemical compounds including acids or metals such as arsenic, beryllium, cadmium, lead or mercury are detected, the process gas analyzer signals the Control valve, to close any access to the remainder of the system and redirect the gas flow back into the furnace. A automatic metering system is then signaled by the software driven computer analyzer operating in conjunction with the process gas spectrometer, to add the appropriate amount of calcium chloride to the molten silica pool necessary to absorb the chlorine molecules responsible for the production of the furans or dioxins detected.

In the case of other hazardous chemical compounds or metals, the contaminated synthesis gas continues to be recycled through the furnace until such time as the hazardous materials have been removed.

A vent pipe 11 is provided to recover the synthesis gas. The synthesis gas is composed of two parts hydrogen and one part carbon monoxide, formed within the plasma arc furnace through the combining of excess carbon molecules and oxygen. This process can be expedited and encouraged to produce even greater amounts of synthesis gas through the addition of water vapor causing a chemical reaction $C+H_2O=CO+H_2$. A cyclone filter 12 is provided to remove entrapped particles of silica and other materials from the synthesis gas stream exiting through vent pipe 11. A return line 13 is provided to return entrapped particles of silica and other materials from cyclone filter 12 back into the molten silica pool in side the plasma arc furnace.

A primary heat exchanger 14 is provided to cool the synthesis gas, which is exiting cyclone filter 12, from temperatures of approximately 1,400° Centigrade down to 538° Centigrade. Otherwise the high temperature of the synthesis gas would melt other components in the system. Steam produced by the cooling process can be directed into the plasma arc furnace to encourage the production of additional synthesis gas, and/or substantial amounts of steam can be directed to a steam turbine and generator for electrical power generation.

Feed water line 15 provides water to heat exchanger 14 to cool the synthesis gas. The water is converted to steam and steam line 16 is provided from the heat exchanger to transport the high pressure steam to a steam turbine or generator.

Uncooled but cleansed synthesis gas is input to a high temperature hydrogen membrane filtering system 20, such as that developed at Los Alamos Laboratories, and currently licensed for manufacture to Coor's Ceramic Filter Corp. and its joint venture partner, Pall Advanced Separation System, Inc. This membrane filtering system 20 is used to split the synthesis gas produced in the plasma arc furnace operating under fast pyrolysis conditions into two distinct gas streams. One composed of pure hydrogen and the other of pure carbon monoxide (CO). Carbon Monoxide can either be combusted in a gas fired boiler 32 to facilitate the recovery of carbon dioxide ($CO_2$) and the conversion of its potential energy in steam, or it can be transported to a compressor and bottled. The hydrogen ($H_2$) can either be converted into energy in fuel cells or it can be transported to a compressor and then fed into containers holding either/or a graphite nano-fiber storage medium or an anhydrous aluminum storage medium, so that the $H_2$ can be for safely stored or transport.

A hydrogen feed line 21 is provided from the high temperature hydrogen membrane filtering system 20, to the fuel cell stacks 22*a* through 22*e* as a fuel supply to them. Fuel cell stacks 22*a* through 22*e* are of the molten carbonate type that cannot tolerate the introduction of carbon monoxide that has previously been separated from the synthesis gas, and they convert the hydrogen fuel gas into electrical energy, heat up to 1500° Farenheit which can be recovered to produce steam, carbon dioxide and water. Power lines 30 are provided to transport the electrical energy generated by fuel cell stacks 22*a* through 22*e*.

Fuel cell exhaust line 23 is provided to direct high temperature carbon dioxide and steam through a primary heat exchanger 24*a* to extract the heat energy contained therein for reuse. A secondary heat exchanger 24*b* is also provided to extract heat energy from fuel cell stacks 22*a* through 22*e* in the form of steam and to aid in converting the steam, entrained with the carbon dioxide, into cool $H_2O$. Exhaust line 25 from secondary heat exchanger 24*b* is used to deliver cooled $H_2O$ and $CO_2$ to a recycling unit where they are separated, purified and recycled for reuse. A water recycling unit 26 is provided to remove carbonates and de-ionize $H_2O$ recovered from the exhaust of fuel cells 22*a* through 22*e*. A feed water line 27 is also provided to deliver cooling water to secondary heat exchanger 24. As this water is heated and turned into steam, the steam produced passes through high pressure steam line 28 to a steam turbine. An exhaust line 29 is also provided from the fuel cells to transport small amounts of $NO_x$, CO and unburned hydrocarbons.

A carbon monoxide line 31 is provided to direct carbon monoxide from the high temperature hydrogen membrane filtering system 20 to a conventional gas-fired boiler 32. Gas fired boiler 32 combusts the CO so that CO2 may be recovered more cost effectively and the potential energy value of the CO manufactured under the fast pyrolysis conditions within the plasma arc furnace may be converted into heat energy. A exhaust port 33 is also provided on the gas fired boiler 32 from which combustion gasses comprised of 25% $CO_2$ can be piped off to a membrane filtering system to recover pure $CO_2$ (not shown). High pressure steam line 35 is provided to transport steam from gas fired boiler 32 to a steam turbine 36. Ball check valves 34*a*–34*c* are strategically placed as shown in FIG. 1 to prevent blow back from occurring into critical devices.

Steam turbine 36 is provided to convert the potential energy of the steam produced by the primary heat exchanger 24*a*, the gas fired boiler 32, and the secondary heat exchanger 24*b* on the fuel cell exhaust line 23, into mechanical force.

Exhaust line 37 is provided to direct steam exhaust from the steam turbine to a condenser 38. Condenser 38 is provided to cool steam exiting the steam turbine in order to facilitate recycling of water. Condenser 38 can be sea water cooled in a barge installation or cooled by an electrically operated chiller, in land based installations when there is a shortage of available water from external sources. An exhaust line 40 from condenser 38 is provided in order to recover the cooled $H_2O$. Feed and return lines 39 are provided to supply the condenser with cooling water and extract it for transport to a water make-up unit which is not shown, but which is known in the art. A generator 41 is provided to convert the mechanical force produced by the steam turbine into electricity. Power lines 42 from generator 41 are used to remove electrical energy from the generator.

Figure 2:
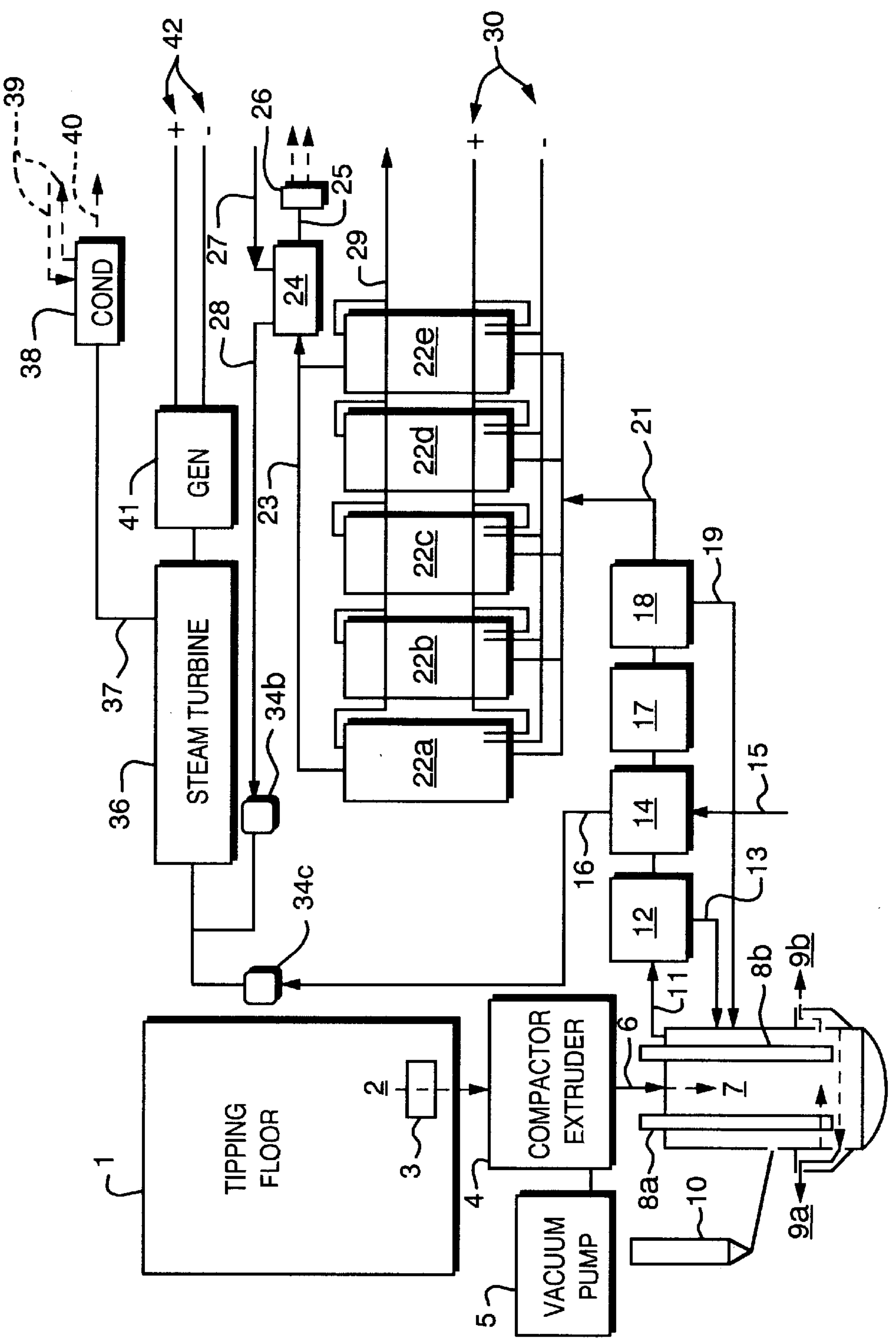
FIG. 2 shows a plasma arc system that allows for the use of molten carbonate fuel cells, together with the production of $CO_2$ and $H_2O$ with greatly reduced emissions of oxides of nitrogen, carbon monoxide or unburned hydrocarbons.

FIG. 2 shows a plasma arc system that allows for the use of molten carbonate fuel cells, together with the production of $CO_2$ and $H_2O$ with greatly reduced emissions of oxides of nitrogen, carbon monoxide or unburned hydrocarbons. FIG. 2 is almost identical to FIG. 1 so most of the elements are not described again. The difference is that in FIG. 2 there is no high temperature hydrogen membrane filtering system 20, no carbon monoxide line 31, no exhaust port 33, no gas fired boiler 32, and no ball check valve 34*a*. Thus, there is no gas fired boiler making use of the carbon monoxide. The carbon monoxide is fed along with hydrogen to fuel cells 22*a*–22*e*. These fuel cells may be molten carbonate or other types of fuel cells which are intolerant to the carbon monoxide in the synthesis gas.

Figure 3:
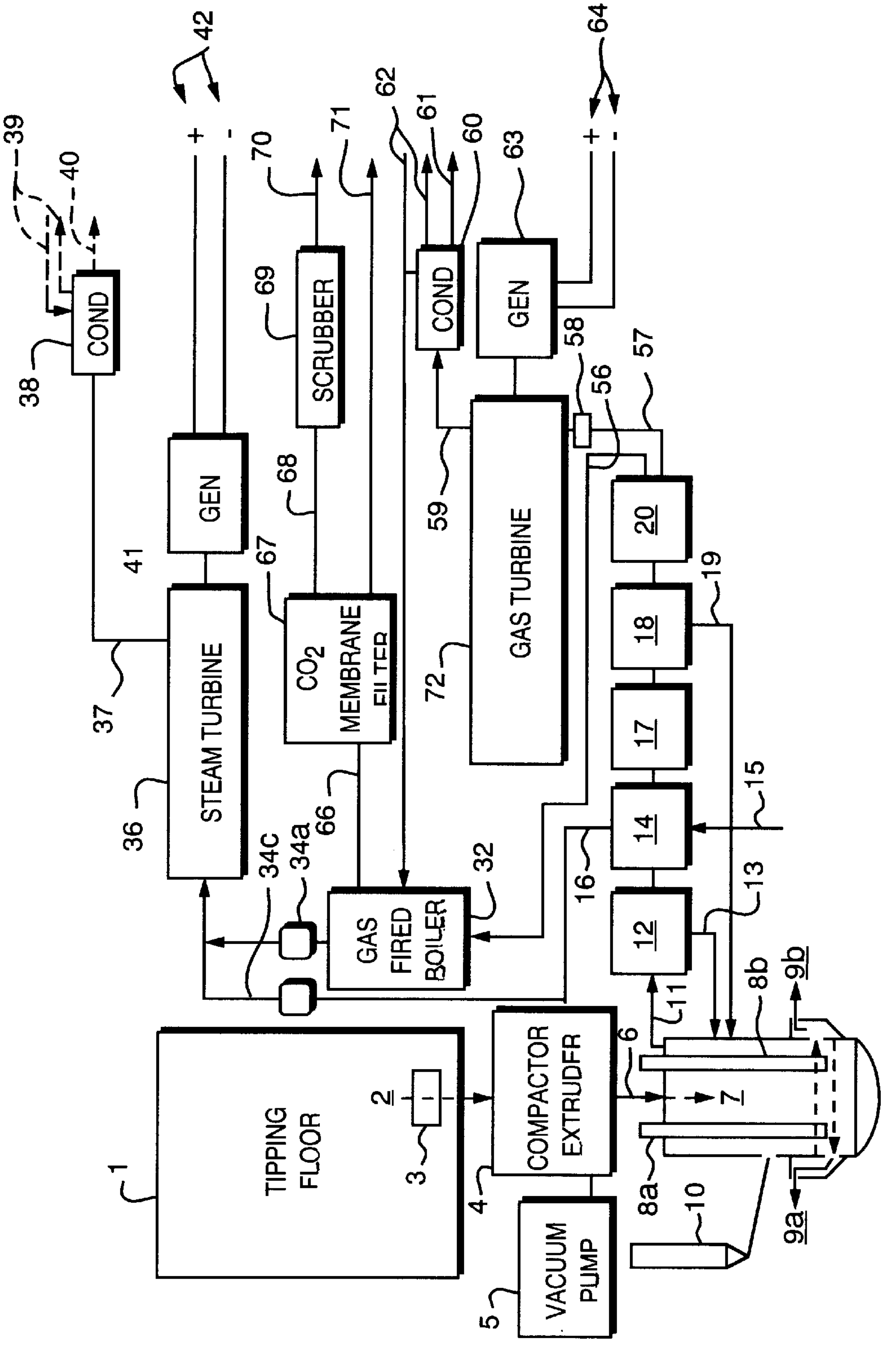
FIG. 3 illustrates a configuration of the system which allows the use of gas turbines to generate electricity without damage to critical internal components from the high combustion temperature of synthesis gas and greatly reduced emissions of oxides of nitrogen.

FIG. 3 illustrates a configuration of the system which allows the use of gas turbines to generate electricity without damage to critical internal components from the high combustion temperature of synthesis gas and greatly reduced emissions of oxides of nitrogen.

The major difference between FIG. 3 and FIGS. 1 and 2 is that instead of there being fuel cells 22*a–e* being driven with the hydrogen from the synthesis gas in FIG. 1, and with straight synthesis gas (hydrogen and carbon monoxide) in FIG. 2, a hydrogen gas driven gas turbine 72 and generator 63 replace the fuel cells 22 to produce electricity. The carbon monoxide still drives a gas fired boiler 32 in the manner shown in FIG. 1.

The hydrogen from high temperature hydrogen membrane 20 in FIG. 3 is input to a fogger water injection system 58 where de-ionized water is added before the combination is burned in gas turbine 72 (or alternatively an internal combustion engine) to convert the energy to mechanical force and drive generator 63 which provides electricity at output 64. The water limits the internal temperatures and thereby prevents heat damage to critical internal components. In addition, the fogger water injection system makes it possible to operate this invention in locations and/or at times when such alternative fuels may not be readily available in quantity. In addition, the use of the irrigation fogger markedly lowers nitrous oxide emissions caused by the high temperatures of the combustion of synthesis gas and/or alternative fuel mixes.

There is also a gas turbine exhaust line 59 to transport the steam laden exhaust from gas turbine 72 to a condenser 60 in order to facilitate the recovery and recycling of the water in a manner. Water output from condenser 60 is taken via exhaust line 61 to a holding tank from where it can be re-used. In addition there are feed and return lines 62 to condenser 60 to supply cooling water to the condenser.

Gas fired boiler 32 is the same as shown in FIG. 1, but there is a difference in that an exhaust line 66 to transport the gas boiler exhaust to a membrane filter 67 that is used to separate and purify the carbon dioxide created by the combustion of carbon monoxide within boiler 32.

One output from membrane filter 67 is an exhaust line that transports noxious gases including nitrous oxides, carbon monoxide, and unburned hydrocarbons to a scrubber 69 to be captured. The scrubbed gasses are then released to the atmosphere via exhaust line 70. The carbon dioxide separated by membrane filter 67 travels via exhaust line 71 to a gas liquefaction system (not shown).

Figure 4:
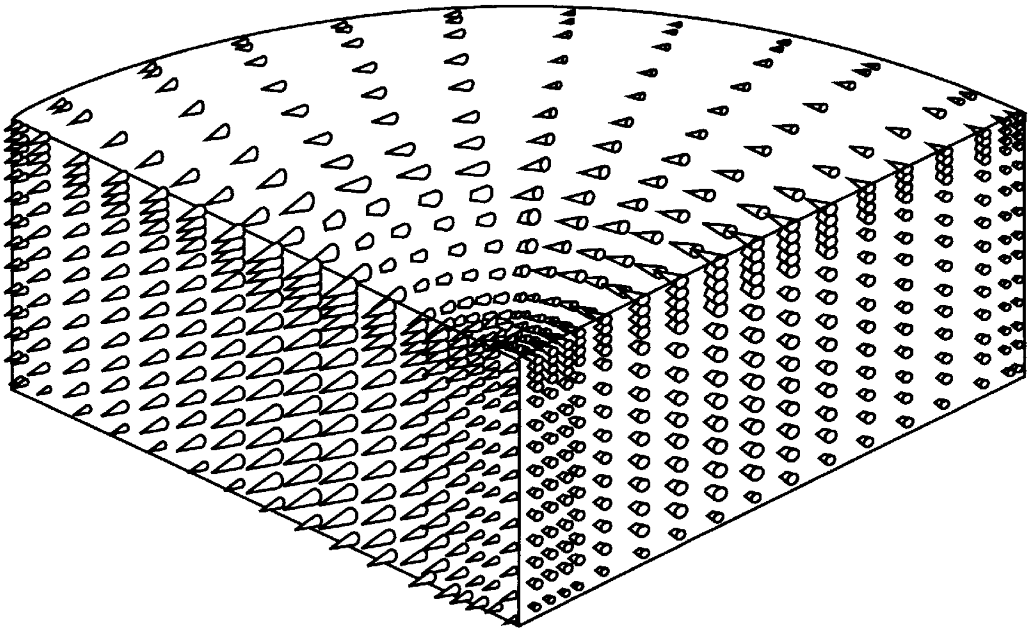
FIG. 4 is a representation of how molten matter in the plasma arc furnace is stirred using an externally applied magnetic field in the molten matter.

FIG. 4 is a representation of how molten matter in the plasma arc furnace is stirred using an externally applied magnetic field in the molten matter. The density or darkness of the arrows in FIG. 4 indicates the velocity at which the melt is being steered. Fewer arrows near the outside perimeter indicate a slower rotational stirring speed, and a greater concentration of arrows near the center indicates a greater rotational stirring speed. This stirring action assures complete conversion of all waste matter 6 injected into the plasma arc furnace.

Alternatively the plasma arc furnace may be equipped with a plurality of electromagnetic coils capable of imparting a stirring action to the molten metal contained within the furnace so that the use of an energy intensive secondary source of heat, such as direct resistance heating electrodes or the AC Powered Jewel Heating System described in U.S. Pat. No. 5,847,353 which reduces the overall efficiency of the conversion of waste into energy, can be avoided.

These electromagnetic coils are strategically placed around the bottom of the plasma arc furnace shell and impart a stirring motion to the molten metal bath contained within the plasma arc furnace. Limited stirring motion is also induced by frictional forces exerted by the molten metal bath upon the molten silica bath that floats above it. Additional stirring forces are imparted by the flow of electrons which are traveling from the graphite electrodes through the molten silica, the molten metal bath and finally to the ground plate in the bottom of the furnace, from the electrodes.

With the systems described herein rapid conversion of large quantities of hazardous, bulky or otherwise problem waste materials including, but not limited to, organic and inorganic materials, industrial or household waste chemicals, chemical weapons, medical waste, infectious or otherwise biologically hazardous materials, human or animal sewerage, soils or marine sediments excavated or dredges from contaminated sites, recovered waste material excavated from landfills, used tires, or used oil filters can be carried out into simple elements including but not limited to carbon, oxygen, hydrogen and to a lesser extent sulfur, potassium and chlorine.

What is claimed is:

1. A method for processing waste material to produce energy and other reusable materials therefrom utilizing a plasma arc furnace having at least one hollow electrode and operating under pyrolytic conditions to ionize and disassociate said material into elements that may be reused, said method comprising the steps of: projecting said hollow electrode into said molten pool of material to create the plasma arc to heat the furnace, and feeding said waste material through said hollow electrode into said molten pool to ionize and disassociate said waste material; and processing said waste material to evacuate air from the waste material before it is fed through said hollow electrodes into said molten pool.

2. The method in accordance with claim 1 further comprising the step of applying inert gas to said waste material under pressure to replace air entrained within the waste material before the waste material is fed through said hollow electrodes into said molten pool.

3. The method in accordance with claim 1 wherein said reusable materials produced by said plasma arc furnace includes synthesis gas and further comprising the step of applying said synthesis gas into said waste material under pressure to replace air entrained within the waste material before the waste material is fed through said hollow electrodes into said molten pool.

4. The method in accordance with claim 1 wherein by feeding said waste material into said plasma arc furnace through said hollow electrodes and directly into said molten pool, hazardous or otherwise problem waste materials are entrapped and do not inadvertently escape ionization and disassociation in said furnace.

5. The method in accordance with claim 1 wherein by feeding said waste material into said plasma arc furnace through said hollow electrodes and directly into said molten pool, hazardous or otherwise problem waste materials are entrapped and do not inadvertently escape ionization and disassociation in said furnace.

6. The method in accordance with claim 3 wherein by feeding said waste material into said plasma arc furnace through said hollow electrodes and directly into said molten pool, hazardous or otherwise problem waste materials are entrapped and do not inadvertently escape ionization and disassociation in said furnace.

7. The method in accordance with claim 1 further comprising the step of applying inert gas to said waste material under pressure to replace remaining air entrained within the waste material before the waste material is fed through said hollow electrodes into said molten pool.

8. The method in accordance with claim 7 wherein by feeding said waste material into said plasma arc furnace through said hollow electrodes and directly into said molten pool, hazardous or otherwise problem waste materials are entrapped and do not inadvertently escape ionization and disassociation in said furnace.

9. The method in accordance with claim 1 wherein said reusable materials produced by said plasma arc furnace includes synthesis gas and further comprising the step of applying said synthesis gas into said waste material under pressure to replace remaining air entrained within the waste material before the waste material is fed through said hollow electrodes into said molten pool.

10. The method in accordance with claim 9 wherein by feeding said waste material into said plasma arc furnace through said hollow electrodes and directly into said molten pool, hazardous or otherwise problem waste materials are entrapped and do not inadvertently escape ionization and disassociation in said furnace.

11. The method in accordance with claim 2 wherein by feeding said waste material into said plasma arc furnace through said hollow electrodes and directly into said molten pool, hazardous or otherwise problem waste materials are entrapped and do not inadvertently escape ionization and disassociation in said furnace.

* * * * *